M. MARTIN.
COMPASSES.
APPLICATION FILED JULY 9, 1917.
1,294,294.
Patented Feb. 11, 1919.
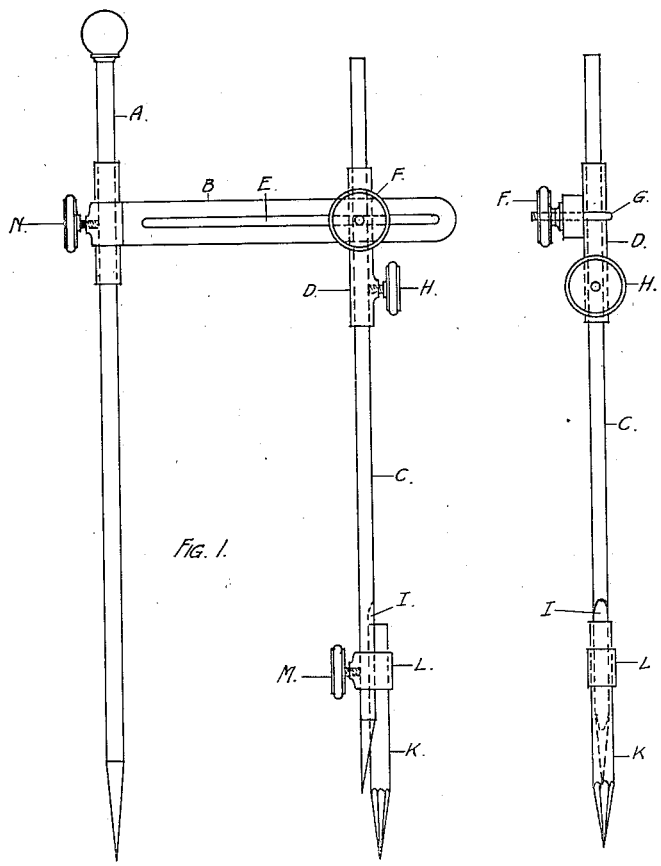
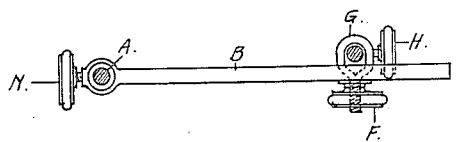
WITNESSES.
INVENTOR.

UNITED STATES PATENT OFFICE.

MARTIN MARTIN, OF CHATHAM, ONTARIO, CANADA.

COMPASSES.

1,294,294.    Specification of Letters Patent.    Patented Feb. 11, 1919.

Application filed July 9, 1917. Serial No. 179,570.

*To all whom it may concern:*

Be it known that I, MARTIN MARTIN, a citizen of Canada, residing at Chatham, in the county of Kent and Province of Ontario, have invented new and useful Improvements in Compasses, of which the following is a specification.

My present invention pertains to compasses, and consists in a peculiar and advantageous compass, hereinafter described and claimed, constructed with a view to enabling a draftsman to accurately describe circles on both plane and irregular surfaces.

In the drawings, which are hereby made a part hereof;

Figure 1 is a side elevation of my novel compass.

Fig. 2 is an edge elevation of the same.

Fig. 3 is a horizontal section, taken in a plane above the arm B.

Similar letters of reference designate corresponding parts in all the views of the drawings.

Among other elements, my novel compass comprises a center shaft A, pointed at its lower end, as illustrated.

Disposed at right angles to the shaft A is an arm B, longitudinally slotted at E. The said arm B is equipped with a sleeve, movable endwise on and about the shaft A and designed to be adjustably fixed with respect to the shaft A through the medium of a set screw N.

At C is a pointer, grooved at I to receive a pencil K, which is detachably connected to the pointer through the medium of a clamping body L and a set screw M. The said pointer C extends through a sleeve D and is adjustably fixed thereto through the medium of a set screw H. The sleeve D, in turn, is positioned in a clamp G, the threaded stem of which is disposed in the slot E of arm B and is equipped with a nut F. By turning the nut F up on the shank of the clamp G, which shank is threaded, the clamp G and the sleeve D are adjustably fixed with respect to the arm B.

My novel compass is susceptible of use to advantage in describing circles on plane or irregular surfaces; it being understood that when a circle is to be described on an irregular surface the set-screw N is loosened to permit of the arm B being turned about the shaft A and to be moved laterally up and down on the shaft.

By holding the center shaft A at an angle to a plane surface an ellipse may be described with facility.

Having described my invention, what I claim and desire to secure by Letters Patent, is:

1. A compass comprising a center shaft, of circular form in cross section, a longitudinally slotted arm receiving and movable endwise along and about said shaft, a set-screw carried by the arm for adjustably fixing the same to the shaft, a sleeve, a pointer adjustably fixed in the sleeve, a clamp receiving the pointer and having a threaded shank disposed in the slot of the arm and threaded, and a nut mounted on the threaded shank of the clamp and adapted to be set against the arm.

2. A compass comprising a center shaft, a longitudinally slotted arm receiving and movable endwise of and about the shaft, a set-screw carried by the arm for adjustably fixing it to the shaft, a pointer arranged in parallelism with the center shaft, a clamp receiving said pointer and having a threaded shank arranged in the slot of the arm, and a nut mounted on said threaded shank and adapted to be set against the arm.

Chatham, June 23, 1917.

MARTIN MARTIN.

Signed in the presence of—
HUBERT S. SMITH,
GEORGE BILLSON.